Feb. 16, 1960     G. E. WEIBEL     2,925,523
WAVE GENERATOR
Filed Feb. 12, 1957     2 Sheets-Sheet 1
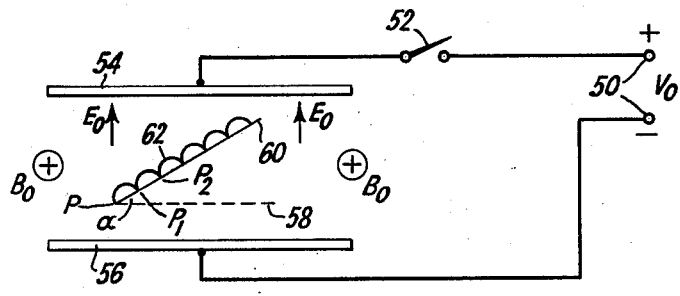
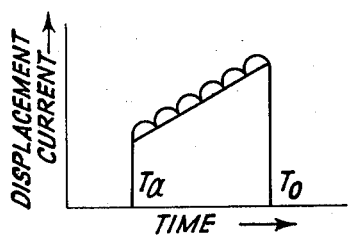 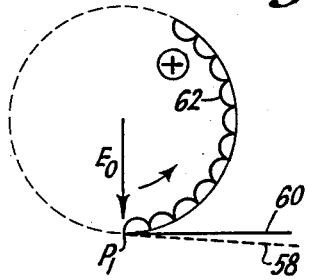
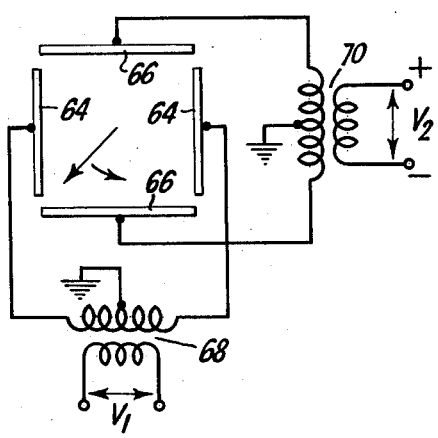 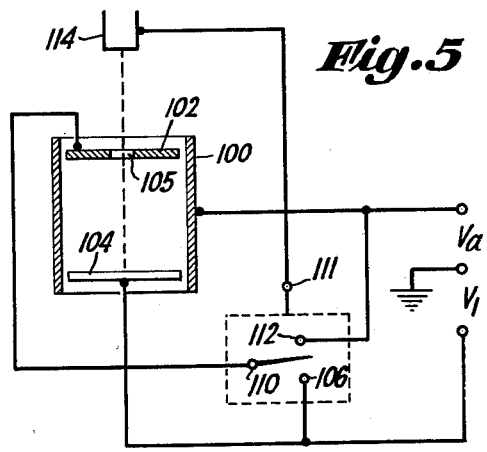
INVENTOR
GERHARD E. WEIBEL
BY
ATTORNEY Feb. 16, 1960
G. E. WEIBEL
2,925,523
WAVE GENERATOR
Filed Feb. 12, 1957
2 Sheets-Sheet 2
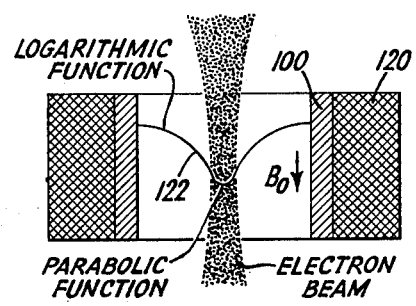
*Fig. 6*
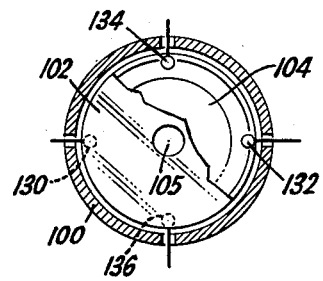
*Fig. 7a*
*Fig. 7b*
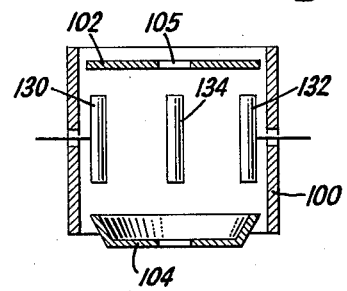
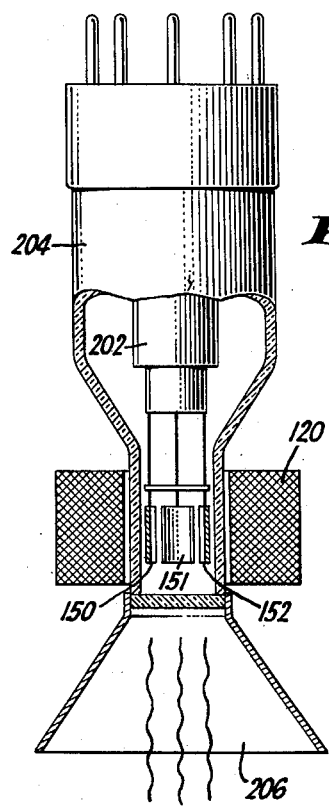
*Fig. 9*
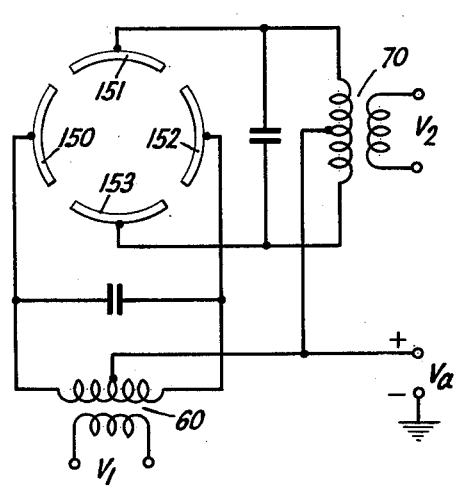
*Fig. 8*
INVENTOR
GERHARD E. WEIBEL
BY *Theodore Jugh*
ATTORNEY

United States Patent Office 2,925,523
Patented Feb. 16, 1960

2,925,523

WAVE GENERATOR

Gerhard E. Weibel, Manhasset, N.Y., assignor, by mesne assignments, to Sylvania Electric Products Inc., Wilmington, Del., a corporation of Delaware Application February 12, 1957, Serial No. 639,813

7 Claims. (Cl. 315—7)

My invention is directed toward wave generators.

In the electronic arts it has become necessary to generate, at relatively high power levels, electromagnetic waves at wavelengths shorter than a centimeter; i.e. millimeter and submillimeter waves. I have invented a device (which I define as a wave generator) that can be used for this purpose.

Accordingly, it is an object of my invention to generate millimeter and submillimeter waves at relatively high power levels.

Another object is to provide new methods for generating electromagnetic waves.

Still another object is to provide new types of devices for generating electromagnetic waves.

Yet another object is to provide new millimeter and submillimeter wave generators which can generate millimeter and submillimeter waves at relatively high power levels.

A further object is to accelerate electrons in such manner that submillimeter waves are radiated therefrom.

Another object is to compress a large number of electrons into a very small volume element, comparable or smaller than the wavelength of the radiation to be generated.

Still a further object is to provide new millimeter and submillimeter wave generators in which are incorporated means for accelerating electrons in such a manner that millimeter and submillimeter waves are radiated from these electrons.

These and other objects of my invention will either be explained or will become apparent hereinafter.

As is well known to the art, an electron, when accelerated, will radiate energy in the form of electromagnetic waves, the radiated power increasing as the magnitude of the acceleration increases.

In accordance with the principles of my invention, I exert a combination of electric and magnetic forces upon an electron bunch containing one or more electrons in such manner as to cause the bunch to traverse a cycloidal path. Under these conditions, the electrons in the bunch will be so accelerated as to radiate electromagnetic waves of extremely short wavelength, as for example, millimeter or submillimeter waves.

More particularly, I confine the electron bunch within a radiation chamber. Two quasi-stationary fields, a uniform electric field and a uniform magnetic field, are established within the chamber, the field directions being such that the electric field vector is always perpendicular to the magnetic field vector. The electric and magnetic forces produced by these two fields act upon the bunch in such manner that the bunch traverses a cycloidal path and the electrons in the bunch radiate in the manner indicated previously.

In one application of my invention the cycloidal path traversed by the bunch is such that the cusps of the path define a straight line which is perpendicular to the magnetic field vector and which intersects the electric field vector at an acute angle. This type of path is obtained when the direction of the electric field does not change; the electric field vector is fixed in position.

In a second application, the path traversed by the bunch is such that its cusps define a circle which lies in a plane perpendicular to the magnetic field vector or stated differently, the bunch describes an epicycloid. This type of path is obtained when the quasi-stationary electric field is circularly polarized in a plane perpendicular to the magnetic field vector; i.e. the electric field vector of constant magnitude rotates uniformly in a plane perpendicular to the magnetic field vector.

In all cases, the power level of the radiated waves increases as the number of electrons in the bunch increases and the dimensions of the bunch are reduced to the order of or less than the wavelength of the radiation to be generated; and hence, relatively large amounts of power can be obtained by use of a tightly compressed bunch containing a large number of electrons. It is to be understood that the term bunch as used herein refers to a collection of one or more electrons which in so far as the generation of radiation is concerned, can be considered equivalent to a single particle carrying an electric charge and also having a mass equal to the sum of the masses of all electrons in the bunch. Stated differently, all of the electrons in the bunch move with the same phase and act as one "rigid" body.

A collection of electrons will only act as a bunch when these electrons are introduced into a localized region in the radiation chamber before the electric field is established. If a collection of electrons are moved into such a region after the electric field is established, the fixed phase relationship of the electrons will be destroyed; the electrons will be randomly phased and, in so far as the generation of energy is concerned, will act as individual particles rather than as a bunch.

Illustrative embodiments of my invention will now be described with reference to the accompanying drawings wherein:

Fig. 1 illustrates, in simplified form, an embodiment of my invention;

Fig. 2 is a graph of certain parameters of the embodiment of Fig. 1;

Fig. 3 is a graph of the cycloidal path of an electron bunch under the influence of mutually orthagonal magnetic and rotating electric fields;

Fig. 4 illustrates, in simplified form, apparatus for producing the cycloidal path shown in Fig. 3;

Fig. 5 shows apparatus for compressing an electron bunch along a given axis;

Fig. 6 is an enlarged cross sectional view of an electron bunch compressed along all radial directions perpendicular to the given axis of Fig. 5;

Figs. 7a and 7b are top and cross sectional views of a radiation chamber utilizing the apparatus of Figs. 5 and 6;

Fig. 8 illustrates an alternative form of the chamber shown in Figs. 7a and 7b; and Fig. 9 shows a tube incorporating the radiation chamber of Figs. 7a and 7b or Fig. 8.

Referring now to Fig. 1, a direct voltage $V_0$ is applied with indicated polarity across terminals 50. One of these terminals is connected to metal plate 56; the other is connected through switch 52 to metal plate 54. The volume subtended between the two plates is evacuated. When switch 52 is closed, a constant electric field (neglecting fringe effects) is established between the two plates, the electric field vector $V_0$ having the direction indicated.

By means (not shown) a constant magnetic induction field is established between the plates in a direction perpendicular to the electric field (i.e. the magnetic field vector $B_0$ points perpendicularly downward into the plane of the paper as indicated on Fig. 1).

With switch 52 open, an electron is positioned at rest at point $P_1$ within the evacuated volume subtended between the metal plates. As will become more apparent hereinafter, this evacuated volume constitutes a radiation chamber.

Since a magnetic field exerts no force on a stationary electron and since no electric field is present, the electrons remain at rest.

Switch 52 is then closed and the electric field is established. The electric field exerts an electric force on the electron in such a direction that the electron travels toward the positively charged plate. As the electron moves, the magnetic field exerts a magnetic force on the electron which is perpendicular both to the magnetic field vector and to the instantaneous direction of electron movement. As a result of the influence of both of these forces, the electron travels toward the right side of Fig. 1 in a cycloidal path 62 having cusps $P_1, P_2 \ldots P_n$.

The magnetic force is always exerted at right angles to the instantaneous direction of electron motion; consequently, no energy can be transferred between the magnetic field and the electron.

During its first half sector of travel along any arc of path 62, energy is transferred to the electron from the electric field; during its second half of the sector of travel, energy is transferred from the electron to the electric field. If the electron were not to lose energy through radiation during the traversal of each semi-circle, the energy transfer in the first half sector would equal the energy of transfer in the second half sector, and the cusps of the path 62 would fall along the dotted line 58 which is parallel to both metal plates and perpendicular both to the electric field vector $E_0$ and the magnetic field vector $B_0$.

However, since the electron is being constantly accelerated, it is constantly radiating energy; this radiated energy is supplied by the electric field. Hence, the energy transferred from the field to the electron during the first half sector of travel exceeds the energy transferred from the electron to the field during the second half sector of travel by an amount equal to the radiated energy. As a result, the cusps of path 62 do not fall along the dotted line 58 but rather fall along the solid line 60. Line 60 intersects line 58 at an acuate angle $\alpha$.

Ultimately the electron is collected at plate 54. During the period in which the electron travels between the plates under the influence of both fields, the motion of the electron induces an increasing image charge on plate 54 and thus produces a displacement current flowing between the plates as shown in Fig. 2 where $t_0$ defines the time at which switch 52 is closed and $t_a$ defines the time at which the charge is collected.

Due to the acceleration of the electron, it radiates energy in the form of an electromagnetic wave. The wave-length of the radiated wave is inversely proportional to the magnetic field intensity. The tangent of angle $\alpha$ (the angle between lines 60 and 58 or stated differently, the angle between line 60 and a line perpendicular to both the electric and magnetic field vectors) is directly proportional to the magnetic field intensity and hence is also inversely proportional to the wavelength of the radiated wave. The power radiated is proportional to the square of the electric field intensity (which in a typical example can be on the order of $10^5$–$10^7$ volts per meter). Hence the wavelength of the radiated wave decreases as the magnetic field intensity increases, while the radiated power increases as the electric field intensity increases.

When an electron bunch is used rather than a single electron (provided that the bunch is positioned before the electric field is produced), the total power radiated by the bunch is no longer merely proportional to the square of the electric field intensity, but rather is proportional to the product of the square of this field intensity and the square of the number of electrons in the bunch. Hence the total power radiated can be sharply increased by increasing the number of electrons in the bunch. In a typical example, the bunch will contain $10^7$–$10^9$ electrons.

It will be apparent that the device of Fig. 1 operates periodically rather than continuously, since subsequent to electron collection at the positive plate the electric field must be cut off and a new bunch of electrons formed, before the electric field can be reestablished.

However, if the electric field is continuously rotated at a frequency much lower than the frequency of the cycloidal variation in a plane perpendicular to the magnetic field, continuous operation can be obtained. Fig. 3 illustrates this situation. The electric field vector rotates in a circle; as a consequence, the cusps of the cycloidal bunch path fall along a circle, i.e. the bunch describes an epicycloid. Thus, the electron bunch is not collected at a plate, but rather travels continuously along an endless closed path.

As indicated in Fig. 4, the field can be rotated by replacing the plates 54 and 56 of Fig. 1 by two pairs of plates 64 and 66. The volume subtended between these pairs of plates is evacuated. A first voltage $V_1$ is applied through transformer 68 between plates 64 and a second voltage $V_2$ is applied through transformer 70 between plates 66. Voltages $V_1$ and $V_2$ are alternating voltages having the same frequency and amplitude but displaced in phase by 90° relative to each other. This apparatus, as is well known to the art, establishes a uniformly rotating electric field within the evacuated volume subtended between the pairs of plates (the radiation chamber).

The device of Fig. 4 generates submillimeter waves in the same manner as the device of Fig. 1, except that the operation is continuous rather than periodic.

Since the frequency of the electric field rotation is much lower than the frequency of the cycloidal motion, by considering the travel of the electron bunch within a time interval sufficiently short to permit the electric field to be treated as if it were a constant rather than a rotating field, it will be found that the same wavelength and power considerations apply both to the device of Fig. 1 and the device of Fig. 4. In Fig. 3, it will be seen that when the electric field is treated as a constant as for example represented by the solid vector $E_0$, the tangent drawn through cusp $P_1$ is represented by the solid line 60 and intersects line 58 (which is perpendicular both to the electric and magnetic field vectors) at angle $\alpha$; this angle is identical with angle $\alpha$ of Fig. 1.

I have found it advantageous to cause an electron bunch to rotate in the manner shown in Fig. 3 and at the same time to periodically actuate and deactuate the rotating electric field of Fig. 4 in the manner shown in Fig. 1.

A device of this type is shown in Figs. 7a and 7b. In order to understand this device, it will be first necessary to discuss the portion of the apparatus which produces the electric field as shown in Fig. 5.

In Fig. 5, there is provided a radiation chamber which comprises a hollow cylinder 100 into which are inserted upper and lower discs 102 and 104. Disc 102 has a central orifice 105; disc 104 has no orifice. For reasons which will become apparent hereinafter, disc 102 is designated as a gate electrode while disc 104 is designated as a repeller electrode. Cylinder 100 is connected to a point of high positive potential $V_a$ and to terminal 112 of electronic switch 108. Repeller electrode 104 is connected to a point of negative potential $-V_1$ and is also connected to terminal 106 of switch 108. Gate electrode 102 is connected to terminal 110 of switch 108. When switch 108 is in the position indicated (for purposes of clarity, this switch is shown in block form, electronic switches being well known to the art), the gate electrode is at potential $V_a$. When the switch position is reversed, as for example under the action of control pulses supplied to terminal 111, of switch 108, the gate electrode is connected to the negative potential point $-V_1$.

A conventional pulsed cathode 114 generates an electron stream during each interval that switch 108 connects the gate electrode to the positive potential point $V_a$. This stream enters the radiation chamber through the aperture 105 of the gate electrode. Due to the negative potential $-V_1$ of the repeller electrode, the electrons in the stream are slowed down in the direction of travel.

When the switch position is reversed, the cathode 114 is cut off, and the negative potential on the two electrodes acts together with the positive potential on the cylinder 100 to trap the electrons in the chamber and compress these electrons in direction parallel to the axis of the hollow cylinder 100.

However, the electrons are free to move radially outward from this axis. Therefore, it is necessary to prevent such movement by compressing the trapped electrons along radial directions perpendicular to the axis of cylinder 100, as shown in Fig. 6. This type of compression is obtained through the action of a magnetic field produced by a coil 120 concentrically mounted about the cylinder 100. As an electron beam enters the radiation chamber, the magnetic field compresses the beam in the manner indicated.

A cross sectional detail view of this portion of the beam is shown in Fig. 6. It will be seen that there is a particular potential variation between the beam and the cylinder 100. The potential profile of this variation is generated by rotating curve 122 about the axis of the beam, or stated differently, curve 122 shows the potential profile in cross section. In the region between the cylinder wall and the beam periphery, curve 122 describes a logarithmic function; in the region between the beam periphery and the beam axis, curve 122 describes a parabolic function. When, as is required in my invention, the electric and magnetic fields are sufficiently intense to prevent expansion of the electron beam, this potential difference is extremely high, for example, on the order of several thousands of volts; and the magnetic field intensity can be on the order of $10^5$–$10^6$ gauss.

The device of Figs. 7a and 7b incorporates the apparatus of Figs. 5 and 6. However, it will be apparent that the electric field established as in Fig. 6 is used to compress the beam; it is parallel to the magnetic field and hence does not effect the cycloidal path shown in Fig. 3.

The electric field required to produce the cycloidal path is established by the use of two pairs of deflection electrodes 130, 132 and 134, 136 which are parallel to the axis of the cylinder 100. These electrodes 130, 132, 134 and 136 are equidistantly spaced circumferentially about the cylinder axis. Electrodes 130 and 132 are equivalent to the deflection plates 64 of Fig. 4, while electrodes 134 and 136 are equivalent to the deflection plates 66 of Fig. 4. The operations of the plates and electrodes are substantially identical. Note that in Figs. 7a and 7b the repeller electrode has the shape of an open cone with an orifice 140 to permit the radiated submillimeter waves to travel axially downward and out of the radiation chamber into space. At this point, the waves can be utilized as required. Alternatively, the repeller electrode can be a disc as before, but in this case can have a central orifice containing a window transparent to the submillimeter radiation.

Fig. 8 shows a variation of the device shown in Figs. 7a and 7b, wherein the cylinder and deflection electrodes are structurally combined, all other portions of these two devices being identical. In Fig. 8 the cylinder is divided into four segments 150, 151, 152 and 153. A direct voltage $V_a$ is applied to all segments and establishes an average potential corresponding to that of the cylinder 100 of Fig. 8. Appropriate alternating voltages are applied to the segments in the same manner as in Fig. 4, segments 150 and 153 being connected as plates 64 of Fig. 4 and segments 151 and 153 being connected as plates 66 of Fig. 4. The alternating voltages establish the rotating electric field used to produce the required cycloidal path.

Fig. 9 shows a tube 200 incorporating the device of Figs. 7a and 7b or Fig. 8.

This tube has an evacuated envelope 204 in which is vertically mounted an electron gun 202 of the type suitable for pulsed operation as for example the Pierce gun used in certain microwave tubes. The radiation chamber of Figs. 7a and 7b or Fig. 8 is mounted within the envelope below the gun. The repeller electrode of the chamber has a window transparent to the passage of the submillimeter waves. A conventional horn radiator 206 is attached to the envelope 204 to guide the radiated waves. A magnet coil 123 is concentrically mounted about the tube envelope in the region of the radiation chamber.

While I have shown and pointed out my invention as applied above, it will be apparent to those skilled in the art that many modifications can be made within the scope and sphere of my invention as defined in the claims which follow.

What is claimed is:

1. In a wave generator, an evacuated radiation chamber; means to periodically inject electrons into said chamber during discretely spaced periods of time; means to establish a uniform magnetic field within said chamber, the magnetic field vector pointing in a given fixed direction within said chamber, said magnetic field acting upon said injected electrons to compress said injected electrons within said chamber along all directions perpendicular to said given direction; and means synchronized with said injection means to periodically establish an electric field within said chamber during the intervals between said electron injection periods, said electric field acting upon said injected electrons to compress said injected electrons within said chamber along all directions parallel to said given direction.

2. In a wave generator, a cylindrical evacuated radiation chamber; first means to periodically inject electrons into said chamber during discretely spaced periods of time; second means to establish a magnetic field within said chamber which acts upon said injected electrons in radial directions with respect to the axis of said chamber to radially compress said injected electrons within said chamber; and third means synchronized with said injection means to periodically establish an electric compression field within said chamber during the intervals between said electron injection periods, said compression field acting upon said injected electrons in directions parallel to the axis of said chamber to axially compresss said injected electrons within said chamber.

3. In a wave generator, a cylindrical evacuated radiation chamber; first means to periodically inject electrons into said chamber during discretely spaced periods of time; second means to establish a magnetic field within said chamber which acts upon said injected electrons in radial directions with respect to the axis of said chamber to radially compress said injected electrons within said chamber; third means synchronized with said injection means to periodically establish an electric compression field within said chamber during the intervals between said electron injection periods, said compression field acting upon said injected electrons in directions parallel to the axis of said chamber to axially compress said injected electrons within said chamber, whereby said compressed electrons constitute an electron bunch; and fourth means to establish another electric field within said chamber which rotates at a constant speed in a plane perpendicular to the axis of said chamber, said rotating electric field and said magnetic field acting upon said bunch to cause said bunch to traverse an epicycloidal path, said bunch during said traversal radiating energy in the form of an electromagnetic wave.

4. In a wave generator, a cylindrical evacuated radiation chamber; first means to periodically inject electrons into said chamber during discretely spaced periods of time, said electrons being injected along a path substantially coincident with the axis of said chamber; second means synchronized with said first means to establish an electric field within said chamber, said electric field during said injection periods, acting upon said injected electrons in a direction parallel to the axis of said chamber to retard said injected electrons along said path, said electric field, during the intervals between said injection periods, acting upon said injected electrons in directions parallel to the axis of said chamber to axially compress said injected electrons within said chamber; and third means to establish a magnetic field within said chamber which acts upon said injected electrons in radial directions with respect to the axis of said chamber to radially compress said injected electrons within said chamber.

5. In a wave generator, an evacuated radiation chamber comprising an electrically conductive hollow cylinder open at both ends, a first electrically conductive electrode positioned within said cylinder adjacent one of said ends and separated from the cylinder wall, said first electrode having a centrally positioned aperture, and a second electrically conductive electrode positioned within said cylinder adjacent the other end and separated from the cylinder wall, said cylinder being maintained at a first direct potential with respect to a reference potential, said second electrode being maintained at a second direct potential less positive than said first potential with respect to said reference potential; and means to periodically apply a third potential more positive than said first potential with respect to said reference potential to said first electrode during discretely spaced periods of time, said first electrode being maintained at said second potential during the intervals between said periods.

6. In a wave generator, an evacuated radiation chamber comprising an electrically conductive hollow cylinder open at both ends, a first electrically conductive electrode positioned within said cylinder adjacent one of said ends and separated from the cylinder wall, said first electrode having a centrally positioned aperture, and a second electrically conductive electrode positioned within said cylinder adjacent the other end and separated from the cylinder wall, said cylinder being maintained at a first direct potential with respect to a reference potential, said second electrode being maintained at a second direct potential less positive than said first potential with respect to said reference potential; means to periodically apply a third potential more positive than said first potential with respect to said reference potential to said first electrode during discretely spaced periods of time, said first electrode being maintained at said second potential during the intervals between said periods; means to periodically inject electrons into said chamber through the aperture of said first electrode during said periods; and means to establish a magnetic field within said chamber, the magnetic field vector pointing in a direction parallel to the axis of said cylinder whereby said injected electrons are bunched.

7. In a wave generator, an electrically conductive hollow cylinder open at both ends; a first electrically conductive electrode positioned within said cylinder adjacent one of said ends and separated from the cylinder wall, said first electrode having a centrally positioned aperture; a second electrically conductive electrode positioned within said cylinder adjacent the other end and separated from the cylinder wall; third, fourth, fifth and sixth electrically conductive electrodes positioned within said cylinder and separated from the cylinder wall and said first and second electrodes, said third, fourth, fifth and sixth electrodes being equidistantly spaced radially about the axis of said cylinder and extending in directions parallel to each other and parallel to said axis; first means to establish a first electric field between said cylinder and said first and second electrodes; second means to establish a second electric field between each of said third, fourth, fifth and sixth electrodes, said second field uniformly rotating in a plane perpendicular to said axis; and third means to establish a magnetic field within said space having its magnetic field vector pointing in a direction always perpendicular to said rotating field.

References Cited in the file of this patent
UNITED STATES PATENTS

| | | |
|---|---|---|
| 2,122,495 | Scott | July 5, 1938 |
| 2,158,114 | Fritz | May 16, 1939 |
| 2,233,779 | Fritz | Mar. 4, 1941 |
| 2,270,777 | Von Baeyer | Jan. 20, 1942 |
| 2,414,121 | Pierce | Jan. 14, 1947 |
| 2,424,965 | Brillouin | Aug. 5, 1947 |
| 2,598,301 | Rajchman | May 27, 1952 |
| 2,680,823 | Dohler et al. | June 8, 1954 |
| 2,745,039 | Bowen | May 8, 1956 |
| 2,808,470 | Hansell | Oct. 1, 1957 |
| 2,824,997 | Haeff | Feb. 25, 1958 |